US006972377B2

(12) United States Patent
Sawyer et al.

(10) Patent No.: US 6,972,377 B2
(45) Date of Patent: Dec. 6, 2005

(54) GLOW RODS WITH EXTERNALLY MOUNTABLE ANCHORING MEMBERS AND RELATED METHODS

(75) Inventors: Charlie Sawyer, Orlando, FL (US); Isaac D. White, Orlando, FL (US); James E. Dickens, Orlando, FL (US); Blake Urban, Lenoir, NC (US); Kevin Forsberg, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 11/039,206

(22) Filed: Jan. 19, 2005

(65) Prior Publication Data

US 2005/0150681 A1 Jul. 14, 2005

Related U.S. Application Data

(62) Division of application No. 10/417,603, filed on Apr. 17, 2003, now Pat. No. 6,867,376.

(51) Int. Cl.⁷ .......................... H01B 17/00; E21C 29/16
(52) U.S. Cl. ........................ 174/135; 174/48; 174/101; 254/134.3 FT; 254/134.3 R
(58) Field of Search ................... 174/48, 49, 65 G, 174/65 R, 65 SS, 68.1, 68.3, 69, 72 C, 73.1, 174/96, 98, 100, 101, 135, 138 B, 138 D, 174/138 E, 138 G, 138 R; 254/134.3 FT, 254/134.3 R, 134.6, 134.7, 134.3 PA, 134.3 CL

(56) References Cited

U.S. PATENT DOCUMENTS

| 1,539,403 | A | * | 5/1925 | Nichols ................ 254/134.3 R |
| 1,817,015 | A | * | 8/1931 | Miller ................ 254/134.3 FT |
| 1,824,924 | A | * | 9/1931 | Edwin et al. ........ 254/134.3 FT |
| 2,241,576 | A | | 5/1941 | Barton |
| 2,410,753 | A | | 11/1946 | Shinomiya |
| 3,052,450 | A | * | 9/1962 | Trunnell ............ 254/134.3 FT |
| 3,312,128 | A | * | 4/1967 | Wasson ............... 254/134.3 R |
| 3,625,084 | A | | 12/1971 | Low |
| 4,033,618 | A | | 7/1977 | Lamb |
| 4,077,609 | A | | 3/1978 | MacFarlane |
| 4,272,860 | A | | 6/1981 | Hinton |
| 4,273,111 | A | | 6/1981 | Tsukaya |
| 4,467,514 | A | * | 8/1984 | Dahlke ................ 254/134.3 R |
| 4,602,495 | A | * | 7/1986 | Yarnell ............... 254/134.3 FT |
| 4,736,978 | A | * | 4/1988 | Cielker ............... 254/134.3 FT |

(Continued)

OTHER PUBLICATIONS http://www.sandman.com/install.html, *Gopher Pole*, 7 sheets, © 2001, printed Feb. 11, 2003.

(Continued)

*Primary Examiner*—Dean A. Reichard
*Assistant Examiner*—Adolfo Nino
(74) *Attorney, Agent, or Firm*—Myers Bigel Sibley & Sajovec

(57) ABSTRACT

Rod assemblies for guiding, routing or feeding a wire and/or cable in a target space of an existing structure having a plurality of frame members and a target internal routing space for the cable or wire, include: (a) an elongate rod having opposing first and second end portions; and (b) an anchoring member attached to the rod first end portion. In position, the anchoring member resides against a surface of a structural frame member to hold the first end portion outside of the target internal routing space and allow the second end portion to extend into the target internal routing space, thereby allowing one end of the rod to remain in a fixed location without requiring a second installer. The elongate rod can be a glow rod.

7 Claims, 8 Drawing Sheets

U.S. PATENT DOCUMENTS

| | | | |
|---|---|---|---|
| 4,848,734 A * | 7/1989 | Ford | 254/134.4 |
| 5,016,504 A | 5/1991 | Brunetto et al. | |
| 5,219,198 A | 6/1993 | Davis | |
| 5,297,443 A | 3/1994 | Wentz | |
| 6,293,519 B1 | 9/2001 | Farretta | |
| 6,691,985 B1 * | 2/2004 | El Haddad | 254/134.3 FT |
| 6,739,581 B1 * | 5/2004 | Carlson | 254/134.3 R |
| 6,805,334 B2 * | 10/2004 | Forsberg et al. | 254/134.3 FT |
| 6,883,782 B2 * | 4/2005 | Ames et al. | 254/134.3 FT |

OTHER PUBLICATIONS http://www.midsouthcable,com/drillbits_images.htm, *MIDSOUTH Wire and Cable Company, Drill Bits/Glo-Rods Images Gallery*, 4 sheets, © 2003, printed Feb. 11, 2003.

http://www.swmud.org/help/things/glow_rod.html, *Star Wars Glow Rod*, 1 sheet, printed Feb. 11, 2003.

* cited by examiner

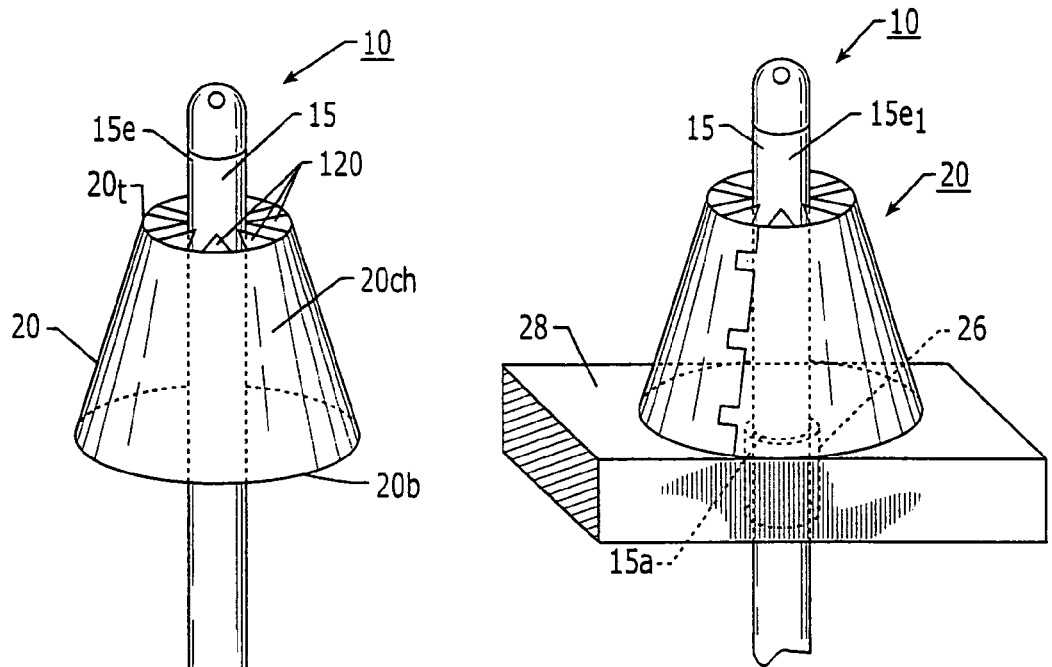
FIGURE 3B
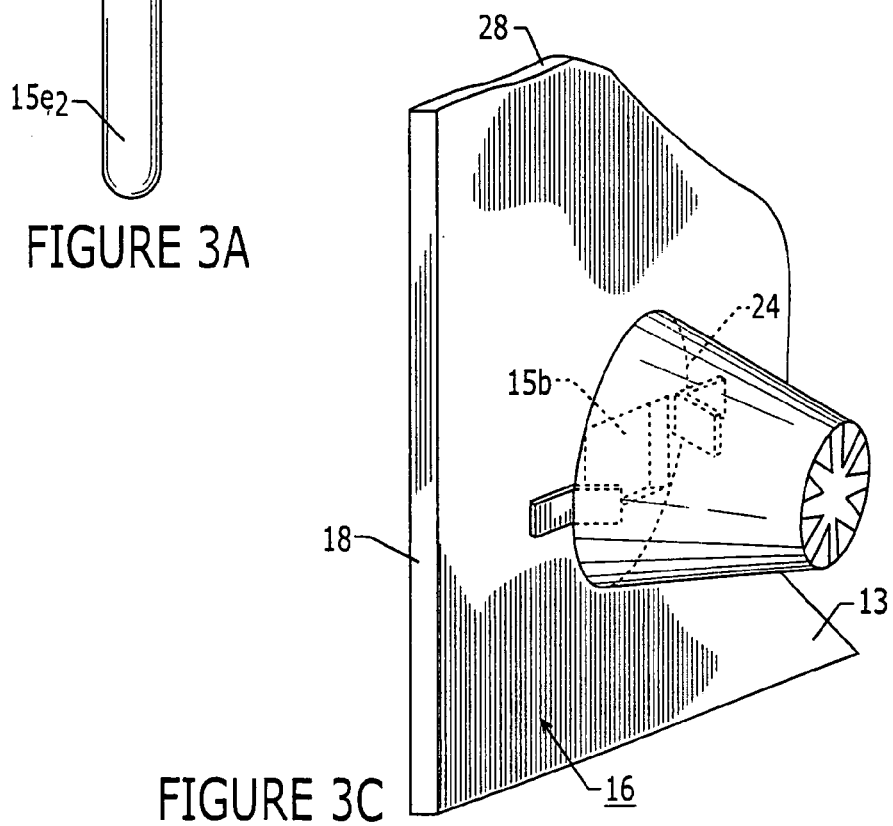
FIGURE 3A
FIGURE 3C

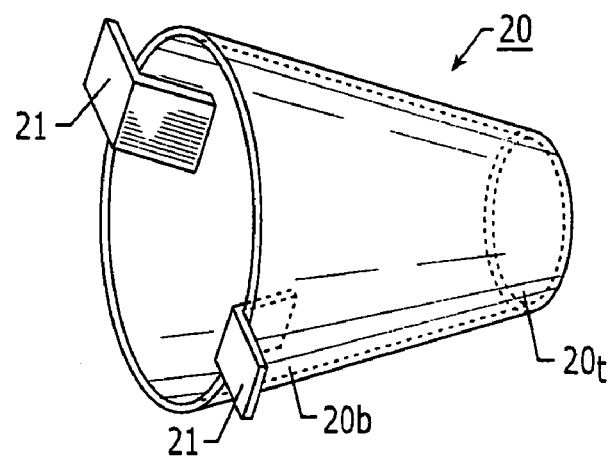
FIGURE 3D
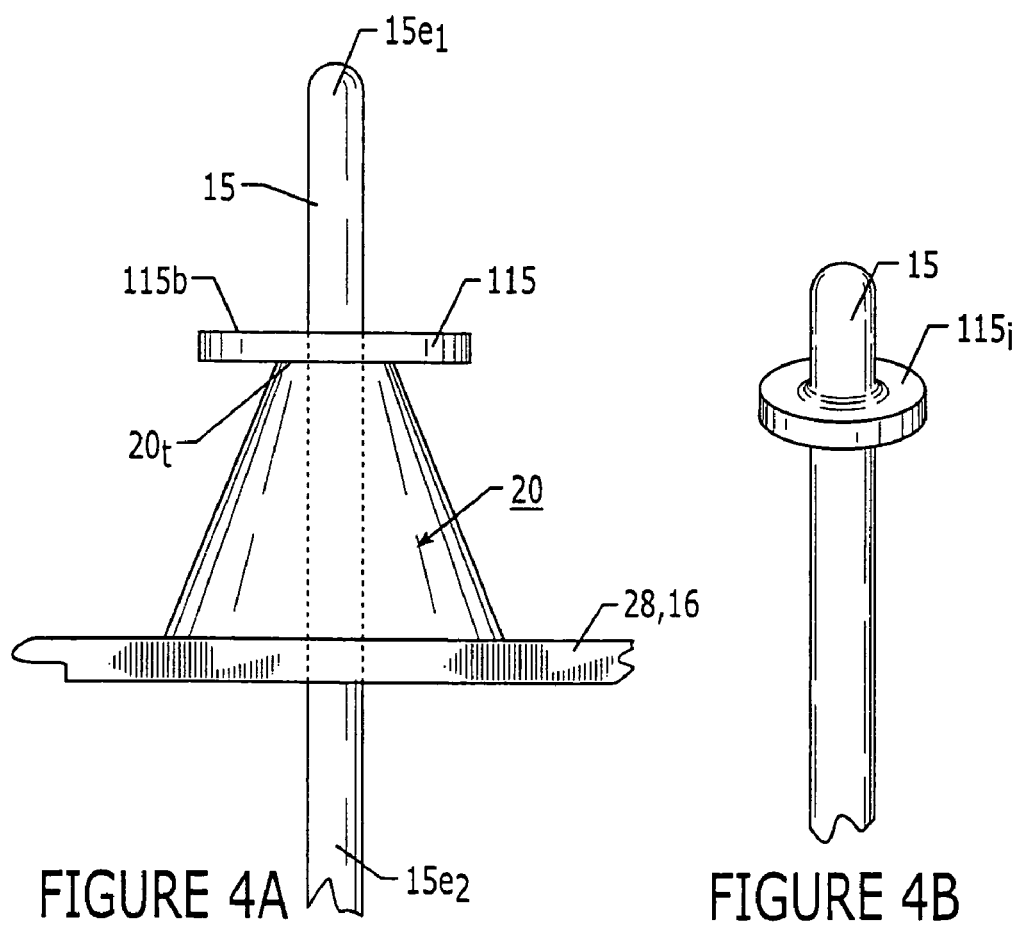
FIGURE 4A
FIGURE 4B

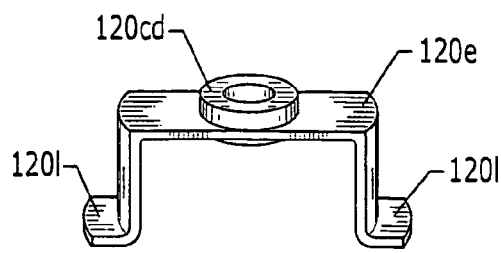
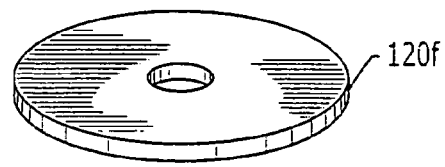
FIGURE 5E  FIGURE 5F
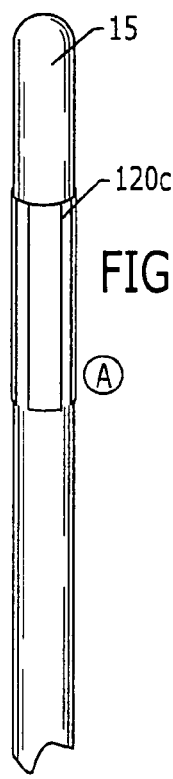
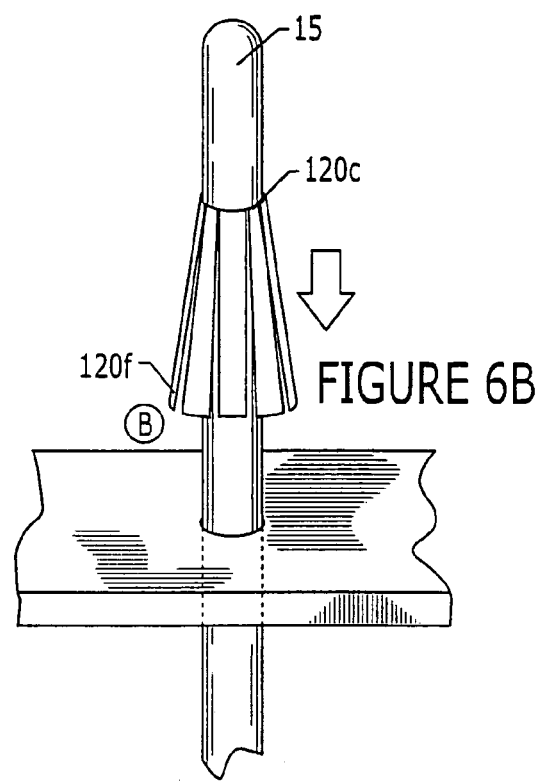
FIGURE 6A  FIGURE 6B
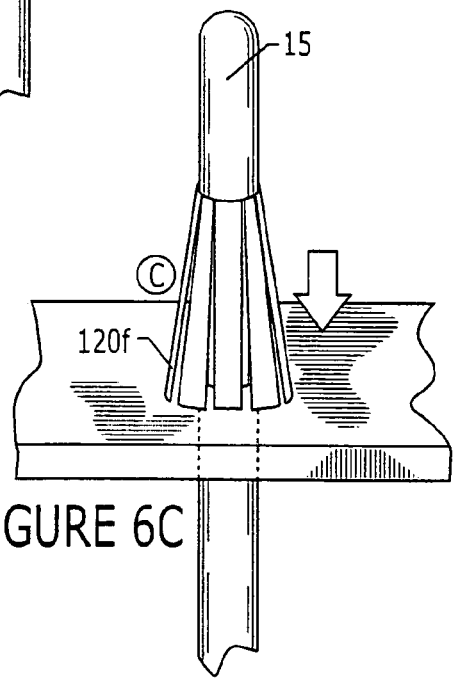
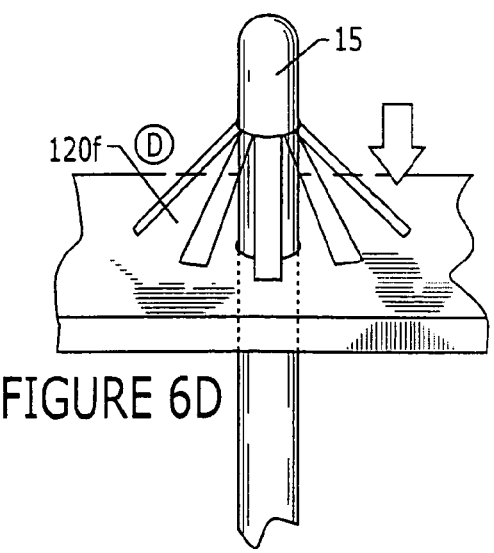
FIGURE 6C  FIGURE 6D

GLOW RODS WITH EXTERNALLY MOUNTABLE ANCHORING MEMBERS AND RELATED METHODS

RELATED APPLICATIONS

This application is a divisional of U.S. patent application Ser. No. 10/417,603 filed Apr. 17, 2003, now U.S. Pat. No. 6,867,376 the contents of which are hereby incorporated by reference as if recited in full herein.

FIELD OF THE INVENTION

The present invention relates to implements or devices for pulling, guiding, or directing cables and wires in structures, and may be particularly suitable for glow rods.

BACKGROUND OF THE INVENTION

Implements or devices have been used to install or route electrical wires and cables in existing structures in various buildings, houses, or other structures. These devices help an installer route or guide the wires and/or cables within existing cavities, ceilings, trusses, attics, trailers, studs, conduits, walls, framed regions, or other structural spaces between or within structures (such as "blind" or tightly bound spaces). The devices or implements can include rods, an electrician's "snake" or semi-flexible rod or "fish" tape. Co-pending, co-assigned U.S. patent application Ser. No. 10/307,058, filed Nov. 30, 2002, entitled Apparatus and Method for Routing Cables and Wires, describes an exemplary apparatus for routing and guiding cables and/or wires. The content of this application is hereby incorporated by reference as if recited in full herein.

Thin long rods have been used to "fish" or guide the cable or wire in crawl spaces or other tightly bound spaces. The glow rod is an elongate thin pole-like device that can be used to "fish" or direct a cable or wire in the router space. One type of rod used to route cables and/or wires is a glow rod. A glow rod is typically configured to be a light-weight device with sufficient rigidity so as to be able to engage and direct a wire or cable to be routed as desired. Certain types of glow rods can generate light through chemical phosphorescence; others are electroluminescent rods that can be internally or externally illuminated. The glow rod may be formed of a transparent or translucent fiberglass material. The glow rod may be between about 5–20 feet long, or longer, and have a relatively small diameter, such as, for example about 0.25–0.5 inches. Certain glow rods may have about a 1 cm diameter and be about 6 feet long. Exemplary glow rods are GLO-RODS available from MidSouth Wire and Cable Company, located in Winston-Salem, N.C.

Unfortunately, use of typical glow rods may require two installers, one on each end of the device in order to use the rod to route the wire and/or cable into the desired position. That is a first installer is required at the entry site to hold the rod as it fishes to an exit site and the other installer is at the exit site where he/she locates the glow rod and then attaches a cable or wire to the rod. The second installer then retrieves the glow rod with the attached wire or cable and routes the glow rod holding the wire or cable through the router space and out through the rod original entry site.

SUMMARY OF THE INVENTION

Embodiments of the present invention provide anchoring members that can be attached to one end portion of a rod to secure the rod externally against a fixed structure (ceiling, stud, wall, beam and the like), while allowing the rod to extend within the target installation space, which, in turn, can permit a single installer to move to a different location, with the rod held in place at the secured location to guide the cable and/or wire in the installation space.

The present invention may be particularly suitable for anchoring glow rods during cable or wire installation in a building.

Certain embodiments of the present invention are directed to rod assemblies for guiding, routing or feeding a wire and/or cable in a target space of an existing structure having a plurality of frame members and a target internal routing space for the cable or wire. The rod assemblies include an elongate rod having opposing first and second end portions and an anchoring member attached to the rod first end portion. In position, the anchoring member resides against a surface of a structural frame member to hold the first end portion outside of the target internal routing space and allow the second end portion to extend into the target internal routing space. The configuration allows one end of the rod to remain in a fixed location without requiring a second installer to hold that end during the installation and/or allowing a single installer to use the rod to position the cable or wire.

Other embodiments are directed to methods for routing or guiding a cable or wire in a target routing space of a structure. The methods include: (a) inserting a rod having opposing first and second end portions into a first aperture formed in a structural member of a structure, the first aperture allowing access to target routing space, so that the second end portion travels through the aperture into the target routing space; and (b) anchoring the first end portion to the structural member so that the first end portion resides external to the first aperture and remains fixed in position.

The method can also include directing the second end portion of the rod to exit the target routing space at a second aperture formed in the structure at a position that is spaced apart from the first aperture.

The anchoring step can be carried out by: (a) affixing an anchoring member to the wall, stud and/or beam so that the anchoring member holds the rod therein; and (c) securing the anchoring member to the rod first end portion so that the first end portion resides above or outside the aperture and the target routing space. The anchoring member can be secured to the rod in advance or after affixing it to the wall, stud or beam.

Still other embodiments of the present invention are directed to kits for a glow rod. The kits include an anchoring member sized and configured to engage a rod channel that is configured to receive and attach to a first end portion of a glow rod and to hold the first end portion of the glow rod above a target routing space in a structural member (such as, but not limited to, a beam, stud, wall, truss, ceiling or other frame structure) while allowing the second end portion of the rod to be directed to travel through the target routing space.

The kits can be used to retrofit glow rods in use in the field or provided as an accessory item with glow rods to allow for use of the anchoring member at desired installation sites. In certain embodiments, the anchoring member is configured to releasably attach to the glow rod during use and is detachable from the rod for storage after use.

In particular embodiments, the kit can include a collar sized and configured to securely attach to the elongate rod first end portion. In position, the collar extends radially outward from the rod.

Other embodiments are directed to rod assemblies for guiding, routing or feeding a wire and/or cable in a target space of an existing structure having a plurality of frame members and a target internal routing space for the cable or wire. The assembly includes an elongate rod having opposing first and second end portions and means for mounting the elongate rod so that a selected one of the first or second end portions resides against a surface of a structural frame member to hold the selected rod end portion outside of a target internal routing space and allow the opposing end portion to extend into the target internal routing space.

The foregoing and other objects and aspects of the present invention are explained in detail herein.

BRIEF DESCRIPTION OF THE DRAWINGS

FIG. 3A is a front view of a rod assembly with an anchoring member according to embodiments of the present invention.

FIG. 3B is a front view of the rod assembly of FIG. 3A shown positioned over a horizontal stud according to embodiments of the present invention.

FIG. 3C is a schematic illustration of a rod assembly similar to that shown in FIG. 3A inserted through an aperture formed in an upstanding wall according to embodiments of the present invention.

FIG. 3D is an end perspective view of an alternative embodiment of the anchoring member shown in FIG. 3A.

FIG. 4A is a schematic front view of a rod with an anchoring member and a stop collar according to embodiments of the present invention.

FIG. 4B is a front view of an anchoring member and rod configuration with a stop collar similar to that shown in FIG. 4A.

FIGS. 5A–5F are front views of examples of differently shaped anchoring members according to embodiments of the present invention.

FIGS. 6A–6D are schematic illustrations of one sequence of operations that may be carried out according to embodiments of the present invention.

DETAILED DESCRIPTION OF EMBODIMENTS OF THE INVENTION

Figure 1:
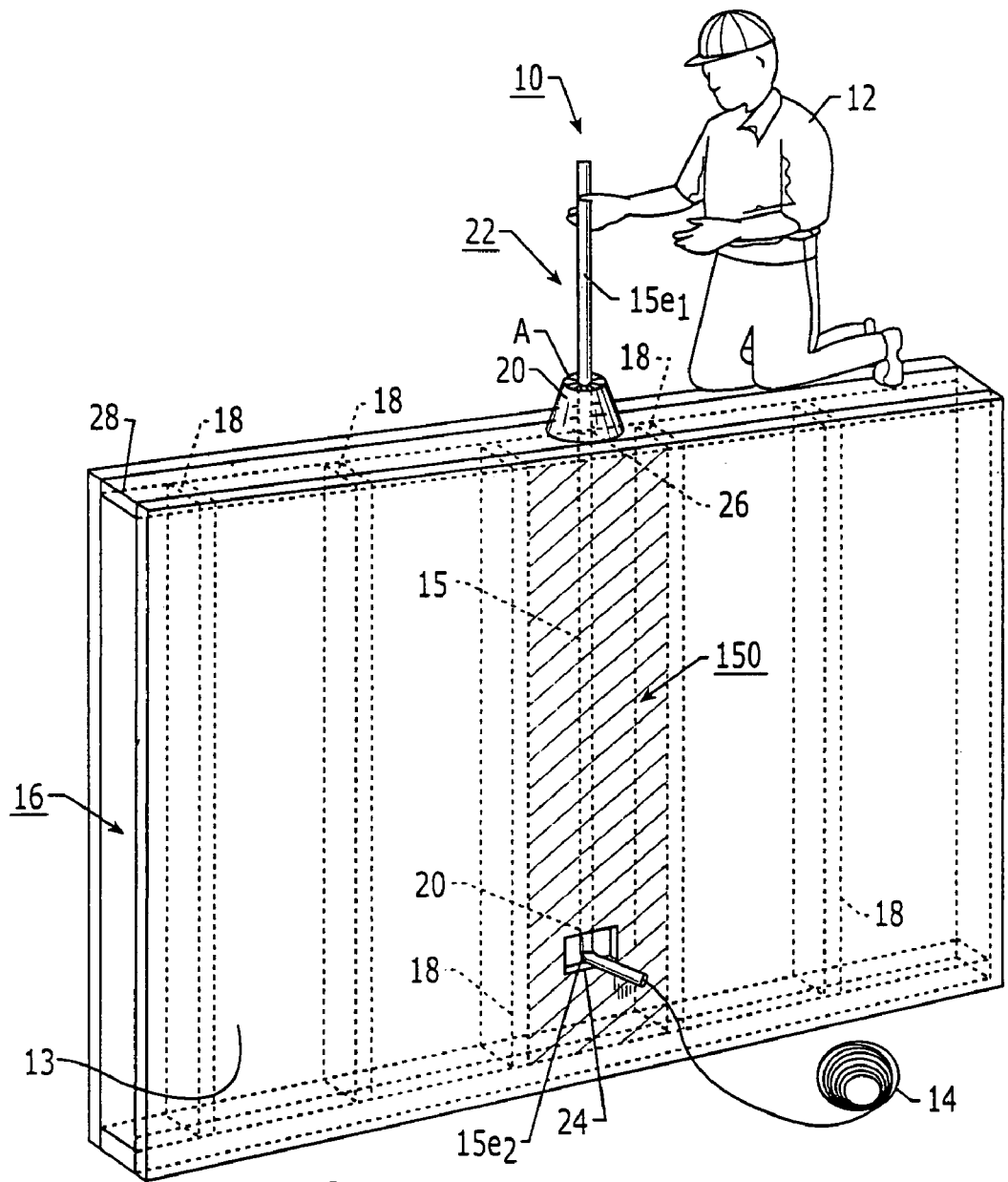
FIG. 1 is a schematic illustration of one type of installation that can be carried out using rod assemblies according to embodiments of the present invention.

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout. In the drawings, layers, regions, or components may be exaggerated for clarity. In the figures, broken lines indicate optional features unless described otherwise. The method steps are not limited to the order in which they are set forth.

The present invention is directed to devices such as long slender rods used to install or route electrical wires and cables in existing structures such as buildings (houses, offices, hospitals, clinics) or other structures. The devices help an installer route or guide the wires and/or cables in router spaces of interest within existing cavities, ceilings, trusses, attics, trailers, studs, conduits, walls, framed regions, or other structural spaces between or within structures (such as "blind" or tightly bound spaces). The router space of interest may include an entry point that is a drilled, chiseled, or cut opening in a stud, wall or other frame member. The router space of interest is typically the space between upstanding walls or between a wall and an unfinished framed portion (truss, ceiling, attic and the like). As shown in FIG. 1, the wall 16 can include one or more vertical studs 18 and a horizontal stud 28 (or header) with a sheet rock or dry wall face 13 and target router space 150 behind the sheet rock face 13 and between adjacent vertical studs 18.

FIG. 1 illustrates the exemplary use of a rod assembly 10 with an elongate rod 15 and anchoring member 20. As shown, the rod 15 includes two opposing end portions $15e_1$, $15e_2$. The anchoring member 20 may be located proximate either the first end portion $15e_1$ (shown as location "A") and/or the second end portion $15e_2$ (shown as position "B"). As shown, at least one end portion $15e_2$ of the rod assembly 10 is configured to attach to a cable or wire 14 that is to be positioned in the router space 150.

Figure 2:
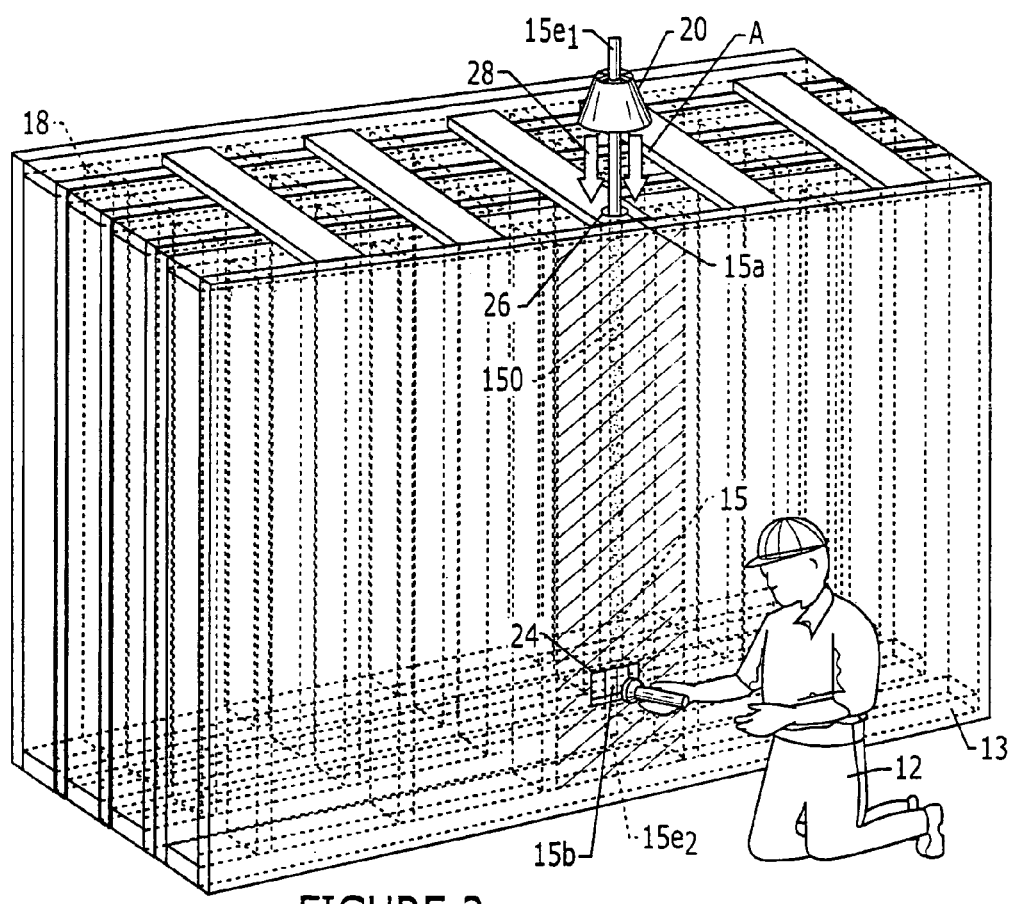
FIG. 2 is a schematic illustration of another exemplary installation according to embodiments of the present invention.

FIG. 2 illustrates the anchoring member 20 held in the upper position "A" with the rod inserted in a first aperture 15a while the technician or installer is able to access the other end of the rod $15e_2$ in the router space 150 via a second aperture 15b. In use, the technician can view through the opening 15b to find the position of the rod 15. In particular embodiments, the rod 15 is an elongate glow rod and the technician may shine a light into the router space 150 and the rod 15 can glow in response thereto, or the glow rod may generate its own light without such external input. The technician or installer can then connect the rod 15 to the cable or wire 14 and return to the upper position to fish or pull the cable or wire 14 through the router space 150 without requiring the use of a second technician to install the wire or cable.

In any event, the installer 12 can use the rod 15 to route or "fish" the cable or wire from an upper location 22 (such as a ceiling, attic or upper floor) to a lower location 24, typically associated with a wall outlet or terminal jack (not shown). The installation can also be carried out in reverse order and/or by mounting the anchoring member 20 at the lower location.

The rod 15 may be a relatively thin rod having a length that is between 5–10 feet or longer. In particular embodiments, the rod 15 will have sufficient rigidity to be able to guide or fish a wire through the desired router space 150 and can have a diameter that is less than about 1 inch, and more typically is between about 0.25–0.33 inches.

FIG. 3A illustrates one embodiment of a rod assembly 10. As shown, the anchoring member 20 has a frustoconical shape with opposing top and bottom portions 20t, 20b, respectively, that define a rod channel 20ch therebetween. The bottom portion 20b of the anchoring member 20 is configured to overlie the wall, beam, stud, ceiling or other entry region or port into the router space 150. As such, the bottom portion 20b of the anchoring member 20 has a width that is larger than the width of the aperture 26 (FIG. 3B) or other access port in the rod entry location into the router space 150. The top portion 20t of the anchoring member 20 is sized and configured to cooperably engage with a first end portion $15e_1$ of the rod 15. The top end portion 20t of the anchoring member 20 may be configured to frictionally engage the rod end portion $15e_1$. As shown in FIG. 3A, the top portion 20t of the anchoring member 20 may include laterally extending baffle segments 120 that frictionally engage the rod 15 to hold the rod in position in the anchoring member 20 while the technician is at the second routing (egress) location.

FIG. 3B illustrates the anchoring member 20 positioned on the top of a wall on a horizontal stud or header 28. A through aperture 26 is formed in the header or stud 28. The rod 15 is inserted through the aperture 26 and the anchoring member 20 engages with the top surface of the stud 28 to hold the first end portion $15e_1$ of the rod 15 in place above the stud 28, thereby allowing the rod 15 to extend downwardly through the router space 150 to the egress or cable/wire exit location.

FIG. 3C illustrates an alternative installation procedure in which the anchoring member 20 is positioned against an upstanding wall and allows the rod 15 to enter laterally into the router space 150 and then travel upwardly to the exit location.

FIG. 3D illustrates that the anchoring member 20 may include brackets at the bottom portion 20b to help hold the anchoring member 20 in place when used for side entries. The brackets 21 may be attached to the wall 16 proximate the aperture 24 location using screws, nails or other attachment members. In other embodiments, the brackets 21 can be configured as spaced apart spring loaded clamps or fingers that can pinch the thickness of the dry wall or sheet rock to hold the anchoring member 20 in position (not shown).

FIG. 4A illustrates another embodiment of a rod 15 with an anchoring member 20. This embodiment includes a stop collar 115 attached to the first end portion $15e_1$ of the rod 15. The stop collar 115 may be configured to extend radially outward about the entire perimeter of the rod 15 or may be configured as discontinuous segments that project outwardly to form the desired stop engagement.

The stop collar 115 is configured to cooperably engage the top portion 20t of the anchoring member 20 to inhibit the rod first end portion $15e_1$ from advancing into the entry or egress aperture and into router space 150. The collar 115 may be configured as two or more outwardly extending bars 115b as shown in FIG. 4A. The bars 115b can be sized to extend a distance beyond the opening at the top portion 20t of the anchoring member 20. The collar 115 may frictionally or matably engage the anchoring member 20 as described above. In other embodiments, the collar 115 may be configured to contact the anchoring member 20 without frictional or matable engagement.

Figure 4C:
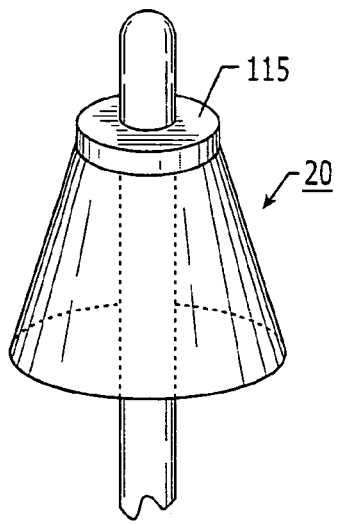
FIG. 4C is a schematic front view of a partial rod with anchoring member according to other embodiments of the present invention.
Figure 4D:
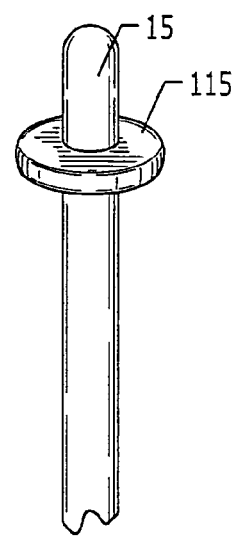
FIG. 4D is a partial front view of a rod assembly that illustrates that the collar may be configured to reside on the rod according to embodiments of the present invention.
Figure 4E:
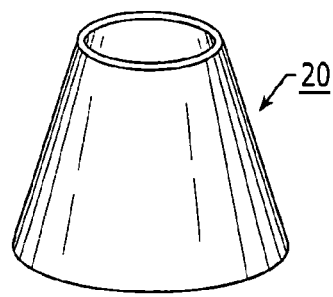
FIG. 4E is a front view of an example of a frustoconical anchoring member.

FIG. 4B illustrates that the collar 115 may be an integrally formed collar 115i on the rod 15 itself. FIG. 4C illustrates that the anchoring member 20 may hold the collar 115 thereon and be sized to frictionally engage the rod 15 during use or assembly. FIG. 4D illustrates a collar 115 formed by an elastomeric ring. FIG. 4E illustrates that the anchoring member 20 may have an open top portion that is sized and configured to receive the rod 15 while inhibiting advancement of the rod above the stop collar 115 into the entry or egress aperture in the structure routing space 150.

Figure 5A:
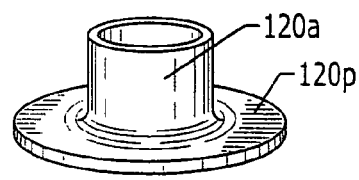
Figure 5B:
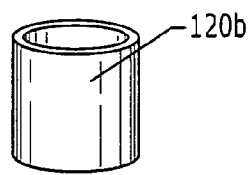
Figure 5C:
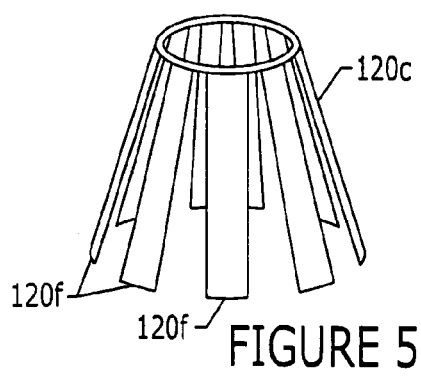
Figure 5D:
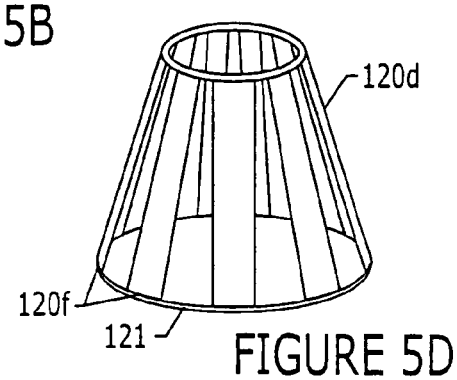

FIGS. 5A–5F illustrate different embodiments of anchoring members 20 that are sized and configured with rod channels that receive and/or hold a portion of the rod 15 therein. FIG. 5A illustrates an anchoring member 120a with a cylindrical body and a planar end segment that resides against the surface of the structure proximate the entry or egress aperture. FIG. 5B illustrates that a cylindrical body anchoring member 120b can be sized and configured to overlie the aperture and hold the rod. FIG. 5C illustrates an anchoring member 120c with a plurality of outwardly extending fingers 120f. The fingers 120f may be resiliently configured with sufficient rigidity to hold the rod 15 against the entry or egress surface in the structure. FIG. 5D illustrates an anchoring member 120d with a bottom edge portion 121 attached for structural reinforcement. FIG. 5E illustrates a stepped anchoring member 120e with a center disc portion 120cd that receives the rod 15 and lower side leg portions 120l that align the center disc portion 120cd over the target (ingress or egress) aperture and hold the anchoring member 120e on the structure surface. FIG. 5F illustrates a disc configuration that can be sized and configured to abut the aperture to hold the rod 15.

Figures 7A, 7B:
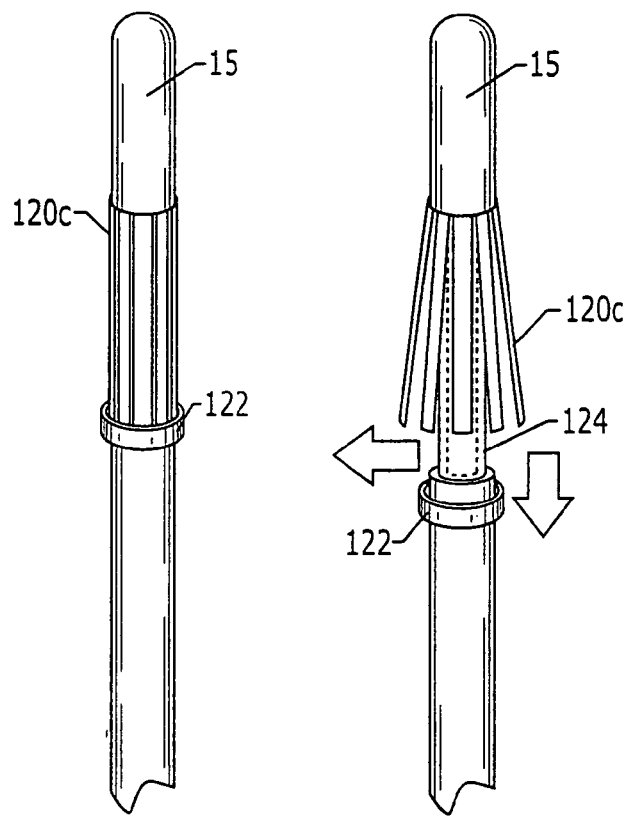
FIGS. 7A and 7B are partial front views of a rod assembly with extendable arms according to embodiments of the present invention.

FIGS. 6A–6D illustrate a sequence of operations that can be carried out to position the rod 15 during an installation. The anchoring member 120c is shown by way of example. The fingers 120c may be formed of any suitable material and may be configured to expand outwardly upon contact with the mounting surface as shown in FIGS. 6C and 6D to hold the weight of the rod 15 so as to keep the rod 15 in the desired position. In particular embodiments, the anchoring member collar 120c may be formed of a resilient metal or elastomer. The fingers 120f may align with the body of the rod 15 during periods of non-use. As shown in FIGS. 7A and 7B, the fingers 120f may be held against the body of the rod 15 in a recess 124 so that the rod 15 and anchoring member 120c define a substantially straight side profile (with the fingers 120f substantially flush with the contour of the body of the rod). A holding member 122 may be used to hold the fingers in tight alignment and moved for deployment as also shown in FIGS. 7A and 7B.

Figures 8A, 8B, 8C:
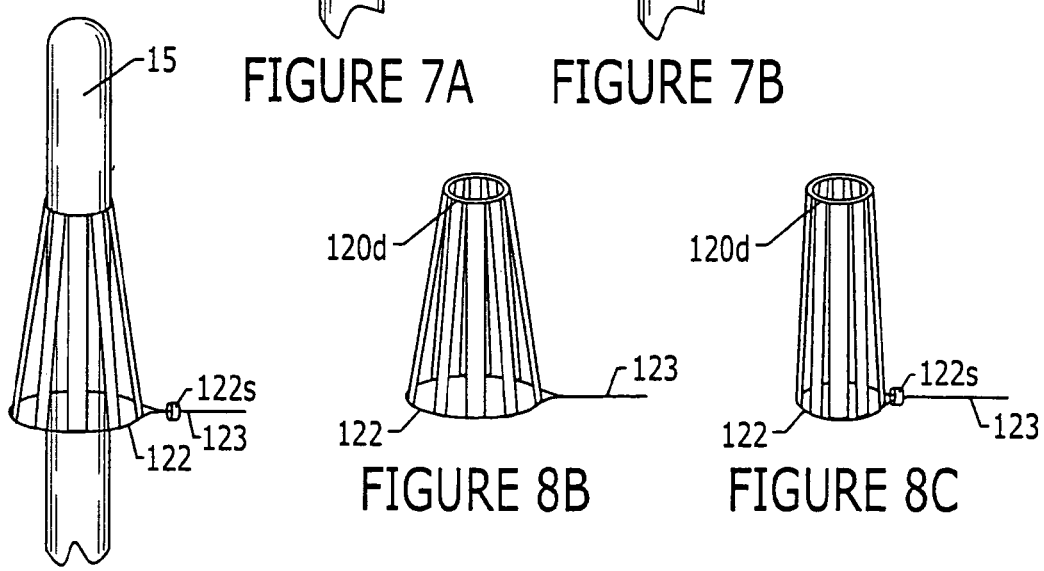
FIG. 8A is a partial front view of a rod assembly with an anchoring member having a skirt with a cord attached to a lower portion of the skirt according to embodiments of the present invention.
FIGS. 8B–8D illustrate that the skirt shown in FIG. 8A may be formed with a plurality of spaced apart segments with the cord configured to be able to gather and release the skirt segments to form the shape desired according to embodiments of the present invention.
Figure 8D:
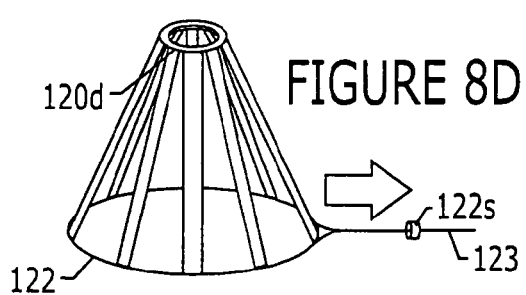

FIGS. 8A–8D illustrate the collar 120d shown in FIG. 5D with the attached bottom edge portion 121 provided by a cord 123. As used herein, the term "cord" includes string, wire, cable, fiber, strand(s) of materials, and the like. As shown, the cord 123 can be configured to adjust the degree of deployment of the fingers 120f. The cord 123 may include a cord stop 122s that defines the degree pf expansion allowed the bottom portion of the fingers 120f and/or that can be used to gather the fingers 120f into a storage configuration (with the fingers 120f arranged to abut as shown in FIG. 8C) similar to that shown in FIG. 6A or 7A.

Figure 9A:
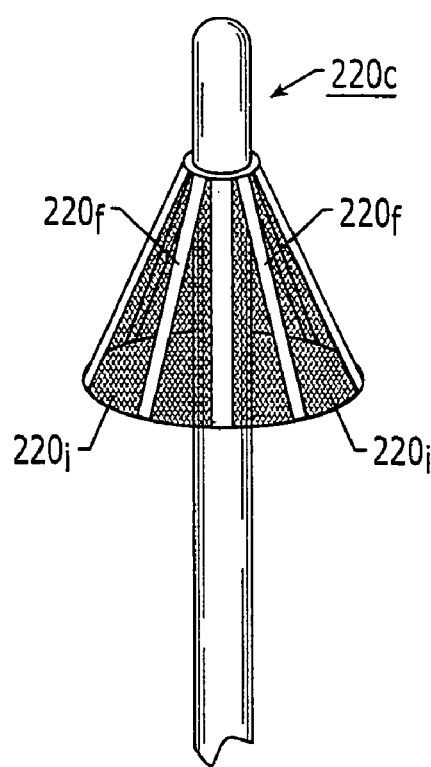
FIGS. 9A and 9B illustrate a continuous skirt configuration with segments that can resiliently stretch radially outward during use and then retract to their original disposition or shape during storage according to embodiments of the present invention.
Figure 9B:
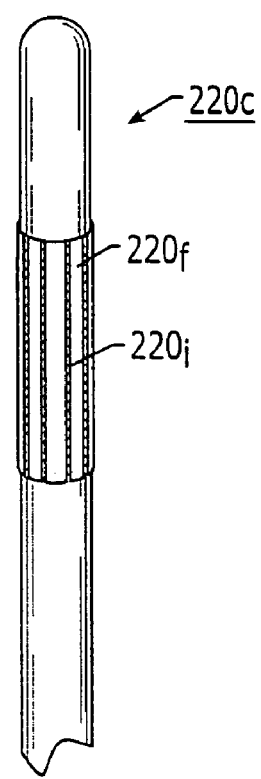

FIGS. 9A and 9B illustrate that the anchoring member 220c can be formed as a continuous skirt that can include a plurality of finger segments 220f separated by intermediate segments 220i. The finger segments 220f can be configured with increased rigidity (similar to the fingers noted above) relative to the intermediately positioned segments 220i. The intermediate segments 220i can be configured to laterally expand and retract (stretch and return) or to fold and/or pleat during periods of non-use. As such, the intermediate segments 220i can be formed of a different material than that of the finger segments 220. In particular embodiments, the intermediate segments 220i may be formed of stretchable fibers or fabrics such those that comprise spandex, other elastomeric materials, textile materials, or other resilient and/or elastically deformable materials.

An example of a stretch fiber is a synthetic manufactured fiber, such as spandex, in which the fiber forming substance is a long-chain synthetic polymer. As generally described in certain literature, it is believed that spandex typically comprises at least about 85% of a segmented-polyurethane. According to certain prior art sources, the polymer chain is a segmented block copolymer containing long, randomly coiled, liquid, soft segments that move to a more linear, lower entropy, structure. Generally stated, the hard segments act as "virtual cross-links" that tie all the polymer chains together into an infinite network. This network prevents the polymer chains from slipping past each other and taking on a permanent set or draw. When the stretching force is removed, the linear, low entropy, soft segments move back to the preferred randomly coiled, higher entropy state, causing the fiber to recover to its original shape and length. This segmented block copolymer is formed in a multi-step proprietary process. It is extruded into a fiber as a monofilament thread line or, for most products, into a multiplicity of fine filaments that are coalesced shortly after they are formed into a single thread line. LYCRA® is an example of a spandex stretch fiber. Other stretch fibers may also be suitable. For example, but not limited to, fibers presently classified in the polyester textile label classification of the U.S. Federal Trade Commission, but under which a new subclass of "elasterell-p" has been proposed, may also be a suitable stretch fiber as it is described as an inherently elastic, bicomponent textile fiber consisting of two substantially different forms of polyester fibers, and DuPont's version of this fiber is referred to as "T400."

In certain embodiments, one or more stretch fibers can be blended with host fibers that may also be synthetic or natural fibers. Thus, selected ones or blends of stretch fibers can be combined with other natural or synthetic fibers such as cotton, wool, silk, RAYON®, and the like.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A kit for a glow rod, comprising:
   an anchoring member sized and configured with a rod channel that is configured to receive and attach to a first end portion of a glow rod and to hold the first end portion of the glow rod above a target routing space in a structural member while allowing the second end portion of the rod to be directed to travel through the target routing space; and
   a collar sized and configured to securely attach to the glow rod first end portion, wherein, in position, the collar extends radially outward from said rod.

2. A kit according to claim 1, wherein, in operation, said collar cooperates with the anchoring member to releaseably engage the rod and the anchoring member together.

3. A kit according to claim 2, wherein the collar is elastomeric.

4. A kit according to claim 3, wherein the collar is releaseably attached to the rod.

5. A kit according to claim 2, wherein the collar is permanently attached to the rod.

6. A kit according to claim 2, wherein the collar is integrally formed on the rod.

7. A kit for a glow rod, comprising:
   an anchoring member sized and configured with a rod channel that is configured to receive and attach to a first end portion of a glow rod and to hold the first end portion of the glow rod above a target routing space in a structural member while allowing the second end portion of the rod to be directed to travel through the target routing space,
   wherein the anchoring member has a plurality of resiliently flexible arms that extend outwardly to abut a surface of the structural member external to the target router space.

* * * * *